(12) United States Patent
Ackerman

(10) Patent No.: US 10,958,344 B2
(45) Date of Patent: Mar. 23, 2021

(54) INTERFERENCE SUPPRESSION WITH MITIGATION OF INTERMODULATION DISTORTION

(71) Applicant: Photonic Systems, Inc., Billerica, MA (US)

(72) Inventor: Edward I. Ackerman, Needham, MA (US)

(73) Assignee: Photonic Systems, Inc., Billerica, MA (US)

( * ) Notice: Subject to any disclaimer, the term of this patent is extended or adjusted under 35 U.S.C. 154(b) by 0 days.

(21) Appl. No.: 16/914,411

(22) Filed: Jun. 28, 2020

(65) Prior Publication Data
US 2020/0412452 A1 Dec. 31, 2020

Related U.S. Application Data

(60) Provisional application No. 62/868,208, filed on Jun. 28, 2019.

(51) Int. Cl.
*H04B 10/2507* (2013.01)
*H04B 10/2575* (2013.01)
(Continued)

(52) U.S. Cl.
CPC ... *H04B 10/25073* (2013.01); *H04B 10/2507* (2013.01); *H04B 10/2543* (2013.01);
(Continued)

(58) Field of Classification Search
CPC ....... H04B 10/2507–25759; H04B 10/50–506; H04B 2210/006; H04B 2210/25
(Continued)

(56) References Cited

U.S. PATENT DOCUMENTS 9,172,471 B2 * 10/2015 Hutchinson .......... H04B 10/532
9,654,217 B2    5/2017 McKinney et al.
(Continued)

OTHER PUBLICATIONS

Urick et al: "Nonlinear optical angle modulation for suppression of RF interference," IEEE Trans. Microwave Theory Tech., vol. 64, No. 7, pp. 2198-2204, Jul. 2016 (Year: 2016).*
(Continued)

*Primary Examiner* — Li Liu
(74) *Attorney, Agent, or Firm* — Rauschenbach Patent Law Group, LLC; Kurt Rauschenbach

(57) ABSTRACT

A method of interference suppression with intermodulation distortion mitigation includes processing an RF signal comprising an RF signal of interest and an RF interfering signal to produce a first and second RF drive signal each with a desired RF interference signal power and having a 90 degree relative phase. The first RF drive signal is imposed onto a first optical signal with a modulator to generate a first modulated optical signal so that the modulator has a large-signal behavior that is characterized by a Bessel function of the first kind $J_1(\phi)$, wherein the desired power at a frequency of the interference signal of the first drive signal is chosen to correspond to a zero of the Bessel function of the first kind $J_1(\phi)$. The second RF drive signal is imposed onto a second optical signal with a modulator to generate a second modulated optical signal so that the modulator has a large-signal behavior that is characterized by a Bessel function of the first kind $J_1(\phi)$, wherein the desired power at a frequency of the interference signal of the second drive signal is chosen to correspond to another zero of the Bessel function of the first kind $J1(\phi)$. The first and second modulated optical signal are combined with an optical power ratio that is selected to suppress third-order intermodulation distortion products in an electrical signal generated by detecting the optically combined first and second modulated optical signals.

20 Claims, 5 Drawing Sheets

(51) Int. Cl.
*H04B 10/2543* (2013.01)
*H04B 10/50* (2013.01)

(52) U.S. Cl.
CPC ... *H04B 10/2575* (2013.01); *H04B 10/50572* (2013.01); *H04B 10/50577* (2013.01); *H04B 2210/006* (2013.01); *H04B 2210/25* (2013.01)

(58) Field of Classification Search
USPC ... 398/79, 115–116, 158, 159, 183–194, 201
See application file for complete search history.

(56) References Cited

U.S. PATENT DOCUMENTS

| | | | | |
|---|---|---|---|---|
| 2010/0046952 | A1* | 2/2010 | DeSalvo | H04B 10/2575 398/115 |
| 2010/0111545 | A1* | 5/2010 | Banwell | H04B 10/66 398/208 |
| 2010/0266289 | A1* | 10/2010 | Devgan | H04B 1/18 398/147 |
| 2014/0270807 | A1* | 9/2014 | Hutchinson | H04B 10/2507 398/184 |
| 2016/0248503 | A1* | 8/2016 | McKinney | H04B 10/2575 |
| 2018/0031946 | A1* | 2/2018 | Middlebrook | G02B 6/29338 |
| 2018/0159569 | A1* | 6/2018 | Liberti | H04B 1/109 |

OTHER PUBLICATIONS

Loh et al: "A nonlinear optoelectronic filter for electronic signal processing," Scientific Reports, vol. 4, Jan. 2014, Article No. 3613. (Year: 2014).*

Vincent J. Urick, et al., Nonlinear Optical Angle Modulation for Suppression of RF Interference, IEEE Transactions on Microwave Theory and Techniques, Jul. 2016, pp. 2198-2204, vol. 64, No. 7.

William Loh, et al., A Nonlinear Optoelectronic Filter for Electronic Signal Processing, Scientific Reports, 4:3613.

* cited by examiner

INTERFERENCE SUPPRESSION WITH MITIGATION OF INTERMODULATION DISTORTION

CROSS REFERENCE TO RELATED APPLICATION

The present application is a non-provisional application of U.S. Provisional Patent Application No. 62/868,208, filed on Jun. 28, 2019, entitled "Interference Suppression with Mitigation of Intermodulation Distortion". The entire contents of U.S. Provisional Patent Application No. 62/868,208 are herein incorporated by reference.

INTRODUCTION

A known problem with many RF systems is the challenge of receiving low-power signals in the presence of interference from other higher-power signals. The powers and frequencies of both the desired signals and the undesired (interference) signals can cover a wide range of values for many practical applications. It is therefore highly desirable to suppress interference signals over a wide dynamic range of interference signal powers, as well as to suppress interference over a wide RF bandwidth.

Photonic systems have been used to improve the reception of low-power signals in the presence of significant interference. In these systems, the RF signals, including both desired and undesired signals, are imposed on an optical signal using an optical modulator. The modulated optical signal is then received at a photodetector to convert the signal back to an electronic signal. While various photonic architectures have been explored to provide RF signal cancellation and suppression using photonic approaches, improvements are still needed to realize systems with better performance, such as broader bandwidth and improved various signal fidelity measures.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1A:
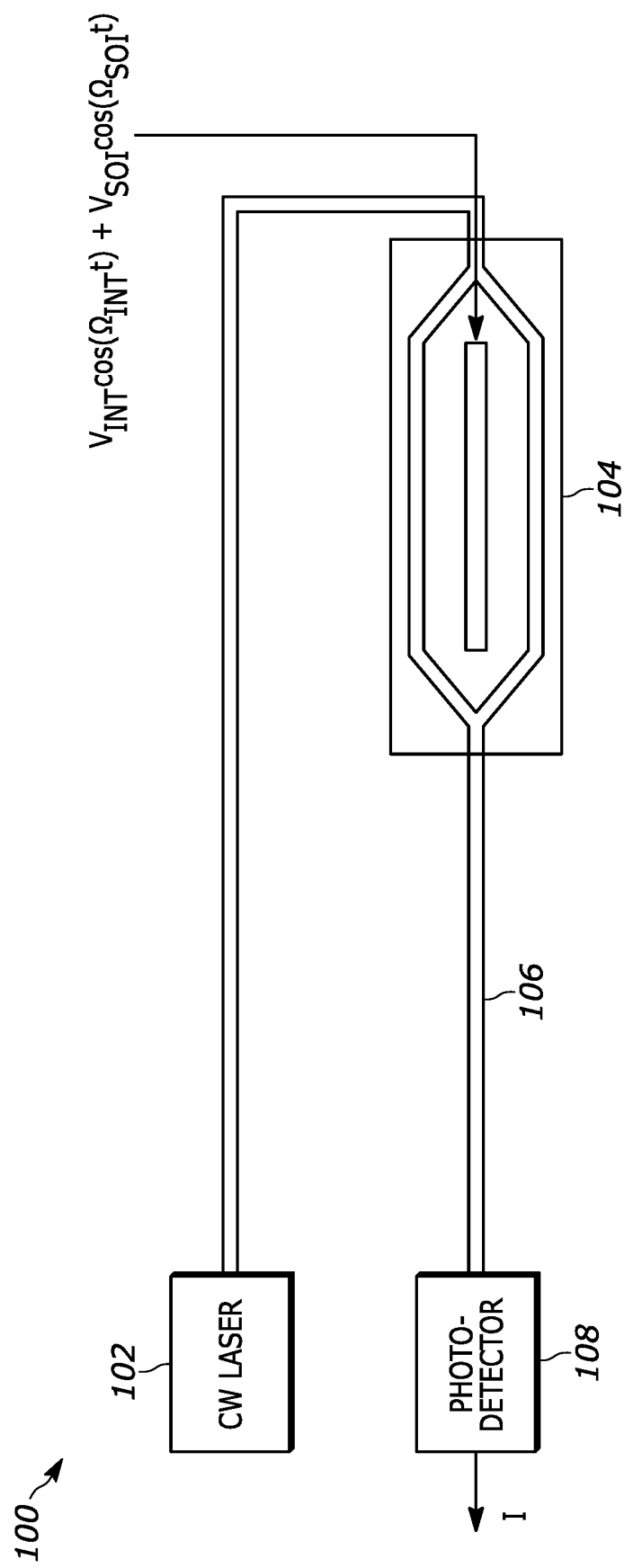
FIG. 1A illustrates a Mach-Zehnder modulator-based link architecture that suppresses a high-power input signal at one frequency $f_{INT}$ while preserving a low-power input signal at a second frequency $f_{SOI}$.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

Designers of RF systems sometimes desire the ability to receive low-power signals of interest, for example with antennas in the presence of one or more signals of sufficiently high-power that interferes with reception of low-power signals of interest. Designers of RF systems also sometimes desire the ability to separate low-power signals of interest, for example, in an electronic processing system from another higher-power signal that is present at the same point in the electronic processing system and interferes with the low-power signals of interest. One of the challenges to designing a system in which high-power signals are simultaneously present with low-power signals is the extent over, and degree to, which the system response function is linear.

The response function of a system will saturate when the signal power is higher than a certain threshold saturation input power. That is, the system response function will be a constant value for any power greater than the threshold saturation input power. When the system response function is in saturation, the presence of the low-power signals is completely masked. The threshold saturation power can be increased by using certain circuit topologies and operating conditions. For example, increasing the power supply voltage alone will increase the saturation power.

For moderately high-power signals, which have powers that are less than the saturation threshold but, greater than the power for which the response is sufficiently linear, these moderately high-power signals can still significantly interfere with the ability of the system to receive the low-power signal. Various linearization techniques can be used to improve the degree to which the system response function is linear. In some cases these linearization techniques are sufficient to enable the system to receive the low-power signal.

Improved circuit topologies and operating conditions, and the use of linearization techniques are all aimed at making the system response function more closely approximate the ideal, which is a function that is perfectly linear over an infinite range of powers. While these techniques can assist in the receiving of a low-power signal in the presence of higher power signals, new approaches are needed to provide better performance.

Recently work has been reported on a new approach to receive low-power signals in the presence of higher-power signals. This approach tries to exploit, rather than linearize, a nonlinear response to enable a low-power signal to be received in the presence of a high-power signal. More than one set of researchers has demonstrated that the inherently sinusoidal nonlinearity of a Mach-Zehnder electro-optic modulator can be leveraged to suppress a high-power interfering signal while simultaneously recovering a lower-power signal of interest. See, for example, V. Urick, J. Diehl, J. McKinney, J. Singley, and C. Sunderman, "Nonlinear optical angle modulation for suppression of RF interference," *IEEE Trans. Microwave Theory Tech.*, vol. 64, ppl 2198-2204, July 2016. Also see W. Loh, S. Yegnanarayanan, R. Ram, and P. Juodawlkis, "A nonlinear optoelectronic filter for electronic signal processing," *Scientific Reports*. When the voltage of the interfering signal imposes optical phase modulation $\phi_{INT}$ in each arm of the Mach-Zehnder interferometer to a degree that corresponds to a zero of $J_1(\phi_{INT})$, where $J_{1n}(\phi)$ is the $n^{th}$-order Bessel function of the first kind, the resulting photocurrent in a detector connected to the output of the modulator is zero at the power level of the interfering signal. The photocurrent is not zero at the power level of a signal of interest that imposes a smaller modulation phase $\phi_{SOI}$ for which $J_1(\phi_{SOI}) \neq 0$. This large-signal, high-power Mach-Zehnder transfer function will be described further herein.

However, an undesirable side-effect of this approach is its generation of third-order intermodulation distortion at twice the interferer frequency±the signal-of-interest frequency. The output power at this intermodulation distortion frequency is, unfortunately, exactly equal to the output power at the signal of interest because the photocurrents at these frequencies are proportional to $J_2(\phi_{INT})$, and $J_0(\phi_{INT})$, respectively, and because $J_{n+1}(\phi) = -J_{n-1}(\phi)$ at all zeroes of $J_n(\phi)$. Hence this technique resolves one issue, the suppression of the high-power signal, but at the cost of creating a new issue, the generation of intermodulation distortion of the same magnitude as the low-power signal.

Techniques for linearizing the system response function can be used to reduce the third-order intermodulation distortion. However, linearization would also significantly reduce or eliminate the suppression of the high-power signal, which is a direct result of the nonlinear transfer function.

The present teaching overcomes many of the shortcomings of known techniques that attempt to receive low-power signals in the presence of higher-power signals. Various aspects of the methods and systems of the present teaching relate to modifying the nonlinear function of the system so as to change one or more particular terms in the function, while otherwise leaving the nonlinear function intact. Such techniques are referred to herein as Nonlinear Function Modification (NLFM). One aspect of the present teaching is applying nonlinear function modification according to the present teaching to suppress the strong interferer while simultaneously recovering a lower-power signal of interest and also while simultaneously suppressing the strong intermodulation distortion product that is generated at a frequency of twice the interferer frequency±the signal-of-interest frequency.

FIG. 1A illustrates a Mach-Zehnder modulator-based link architecture 100 that suppresses a high-power input signal at one frequency $f_{INT}$ while preserving a low-power input signal at a second frequency $f_{SOI}$. A CW laser 102 generates a CW optical signal at an output that is connected to an optical input of a Mach-Zehnder modulator 104. The modulator 104 modulates the optical signal. An output of the Mach-Zehnder modulator 104 is optically coupled to an optical link 106, which may be a single mode fiber. A photodetector 108 is positioned along the optical link. The photodetector 108 generates an electrical current, I, at an electrical output in response to the detected optical signal provided by the link 106. To illustrate the operation, we assume the high-power and low-power signals are represented by single frequency, continuous wave sine waves. The extension to finite bandwidth systems is straightforward.

A large-signal model is used to predict the cancellation of a high-power signal in the Mach-Zehnder modulator-based link architecture 100. The Mach-Zehnder modulator has an inherently sinusoidal transfer function that acts upon signals that themselves are sinusoidal waves. The result is that the output fundamental signals and the distortion products are characterized by Bessel functions of the first kind. In conventional photonic links, that is, links that do not perform interference signal cancellation but that can use these same components, all parameters of interest are usually predicted using small-signal analysis, in which the Bessel functions are approximated as finite series and only the lowest-order term or few terms are examined.

Figure 1B:
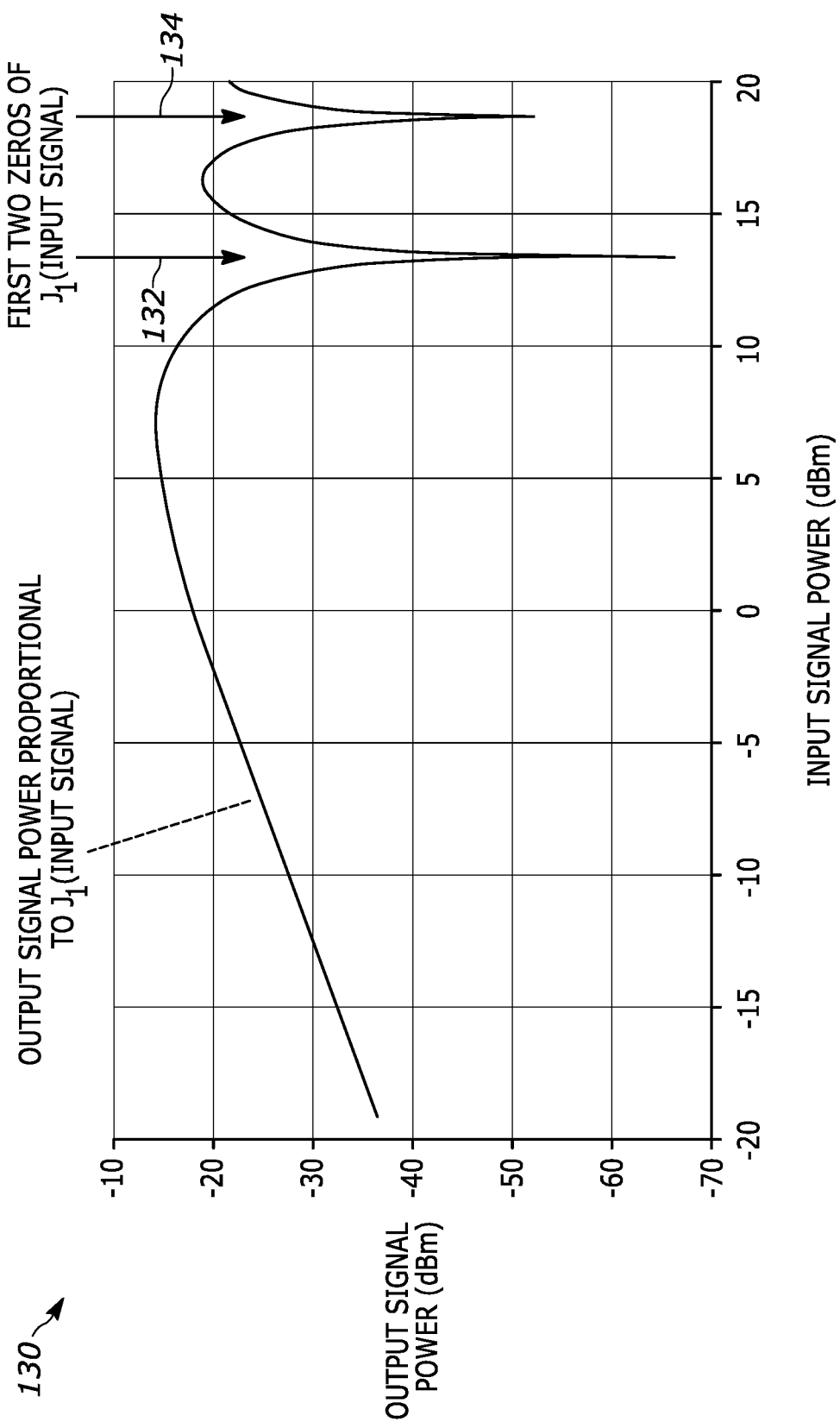
FIG. 1B illustrates a plot showing the output signal power as a function of input signal power for a fiber-optic link that uses the Mach-Zehnder interferometric modulator link architecture of FIG. 1A.

FIG. 1B illustrates a plot 130 showing the output signal power as a function of input signal power for a fiber-optic link that uses the Mach-Zehnder interferometric modulator link architecture of FIG. 1A. The plot 130 illustrates the large-signal, Mach-Zehnder transfer function that shows the first two zeros 132, 134 of $J_1(\phi)$ which is the first-order Bessel function of the first kind, and in which $\phi$ is the angle modulation. Because of the modulator's sinusoidal transfer function, the link's large-signal behavior can be described by Bessel functions of the first kind. The link output is greatly suppressed at all input powers for which $J_1(\phi)=0$. For the specific Mach-Zehnder modulator modeled here, the first two zeroes 132, 134 of $J_1(\phi)$ occur at input powers of +13.3 dBm and +18.6 dBm.

Figure 1C:
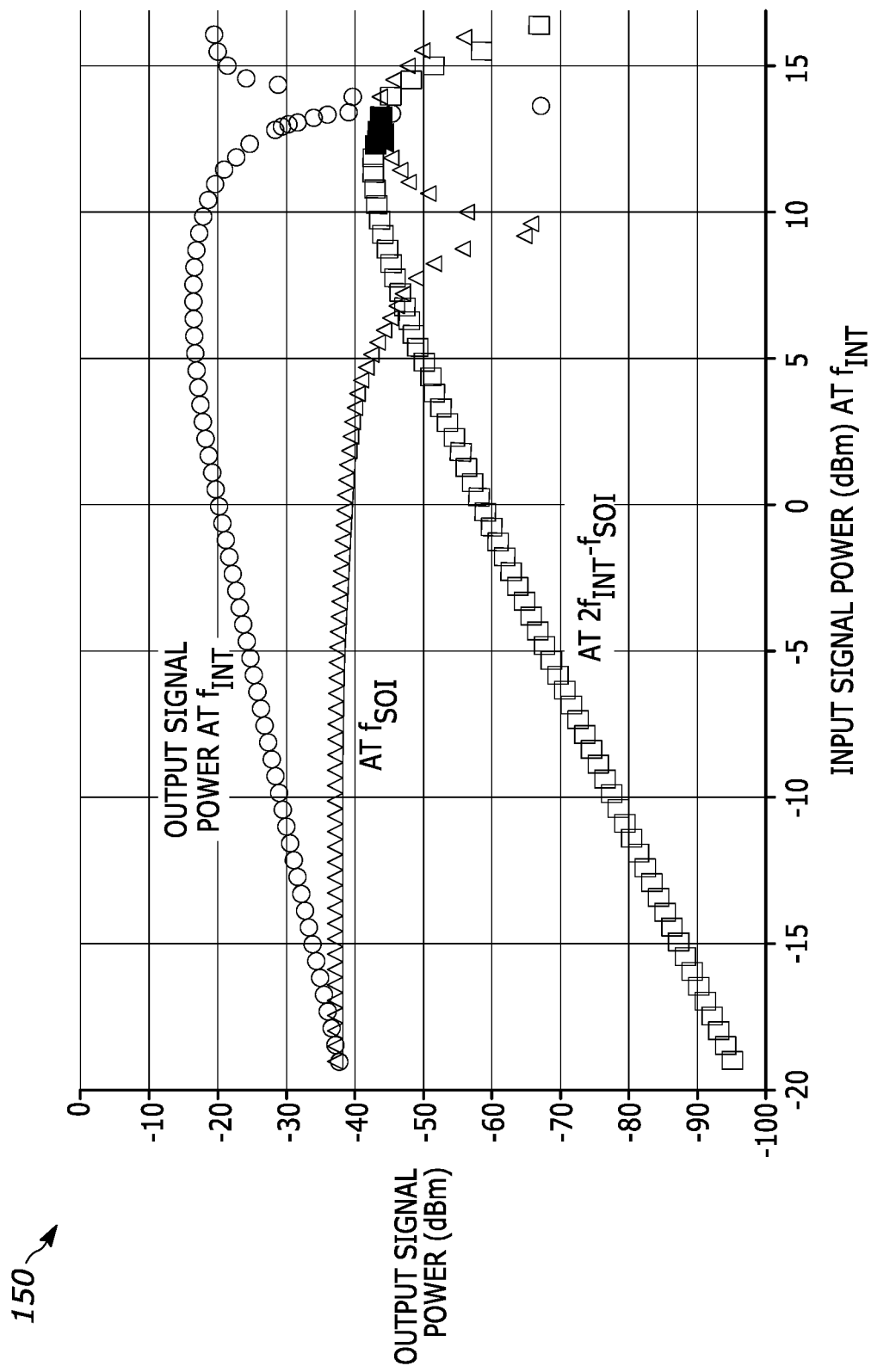
FIG. 1C shows a graph of the measured performance of a known technique of suppression of RF interference.

FIG. 1C shows a graph 150 of the measured performance of a known technique of suppression of RF interference. The graph 150 is based on data from V. Urick, J. Diehl, J. McKinney, J. Singley, and C. Sunderman, "Nonlinear optical angle modulation for suppression of RF interference," *IEEE Trans. Microwave Theory Tech.*, vol. 64, ppl 2198-2204, July 2016. The graph 150 shows the measured performance of the technique described in that paper. The graph 150 illustrates a plot of the output signal power as a function of input signal power. The graph 150 shows the output of a link when two CW sine waves are input: the high- and low-power input signals were supplied at frequencies $f_{INT}=1,001$ MHz and $f_{SOI}=1,000$ MHz, respectively. The low-power signal's input power was kept constant at −19 dBm while the high-power signal's input power was varied from −19 to +16 dBm. For a low-power signal at $f_{SOI}=1,000$ MHz with a constant input power of −19 dBm and a high-power signal at $f_{INT}=1,001$ MHz with input power varying from −19 dBm to +16 dBm, the measured output power at $f_{SOI}$, $f_{INT}$, and $2f_{INT}-f_{SOI}=1,002$ MHz are plotted. The plots show that, at a high-power signal input power of approximately +13 dBm, the output power at $f_{INT}$ is greatly suppressed but the intermodulation distortion product at $2f_{INT}-f_{SOI}$ is exactly equal to the output power of the low-power signal at $f_{SOI}$. It can be seen that when the input power of the high-power signal at $f_{INT}$ is approximately +13 dBm, which for the modulator used in this experiment corresponded to the first zero of $J_1(\phi_{INT})$, the output power at $f_{INT}$ is suppressed by ~60 dB. However, an additional undesired term is generated at $2f_{INT}-f_{SOI}=1,002$ MHz that has the same output power as the desired, low-power signal at 1,000 MHz. In this example, where the signals are single frequency continuous wave sine waves, it should be possible to filter out the undesired term. But, in an actual application, with "real" signals having a finite bandwidth, filtering would not be completely effective.

The methods and apparatus of the present teaching relate to the nonlinear function modification for interference suppression including mitigation of intermodulation distortion. In particular, one feature of the methods and apparatus of the present teaching is that they can reduce or eliminate the undesirable intermodulation distortion product signal term of the nonlinear processing described in connection with FIG. 1C. It should be understood that is possible to realize nonlinear function modification in either the analog domain or the digital domain.

Unlike known suppression techniques that involve using a small-signal model to derive the particular operating parameters, the present teaching utilizes a large-signal model to derive the particular operating parameters. The methods and apparatus of the present teaching are described in connection with a Mach-Zehnder interferometric optical modulator driven in a large signal mode of operation. However, the NLFM techniques described herein are not limited to large-signal optical modulation. For example, NLFM can be applied to RF components, such as amplifiers using large-signal models appropriate for the transistors used in the amplifier to derive the required operating parameters and then modify the RF component's operation appropriately to achieve large signal operation to suppress RF interfering signals while simultaneously reducing third-order intermodulation distortion products.

Figure 2:
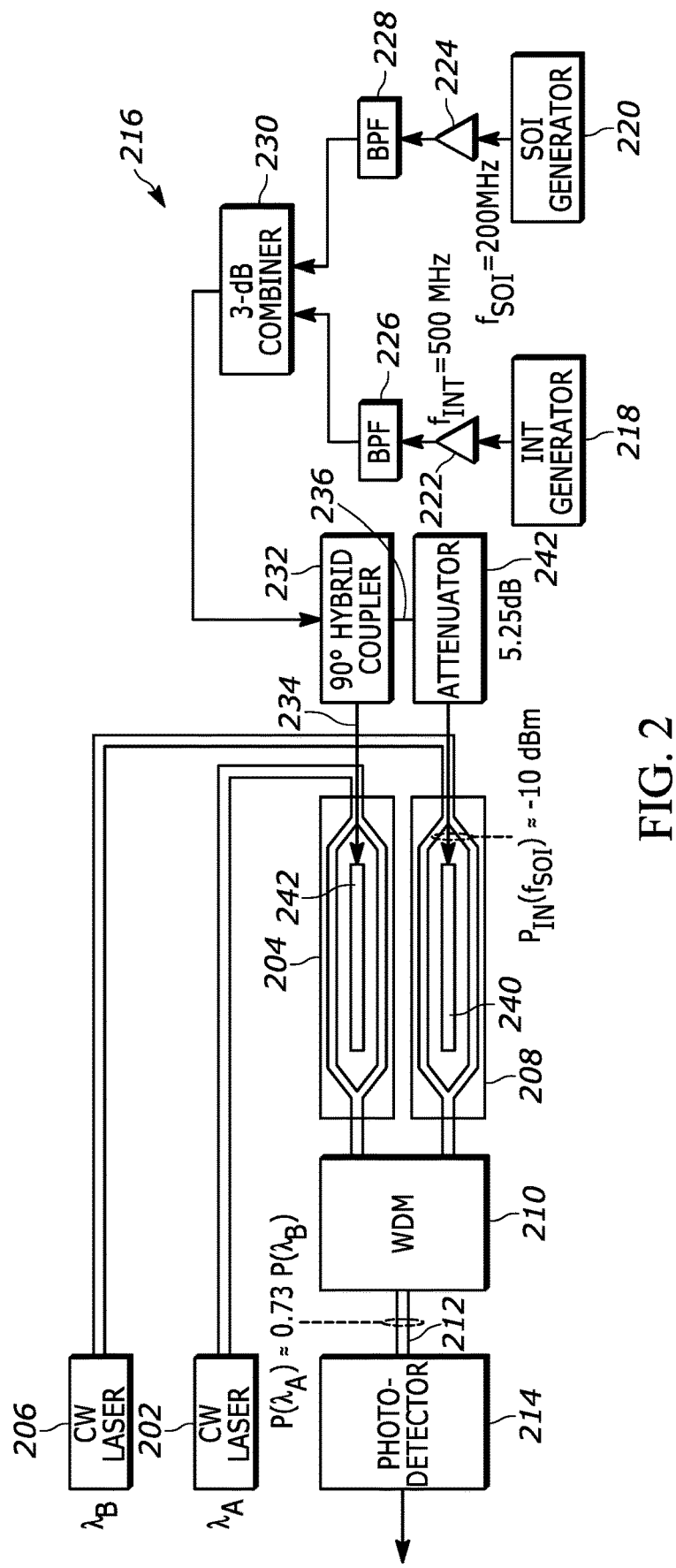
FIG. 2 illustrates an embodiment of a Mach-Zehnder modulator link using a nonlinear function modification (NLFM) system of the present teaching.

FIG. 2 illustrates an embodiment of a Mach-Zehnder modulator link 200 using nonlinear function modification system of the present teaching. In particular, FIG. 2 illustrates an analog-domain implementation of the interference suppression nonlinear function modification technique according to the present teaching. It should be understood the numbers shown in the link 200 are for illustrating one specific example and are not meant to limit the teaching in any way.

Some known RF systems use two parallel Mach-Zehnder modulators to achieve linearization in an effort to extend the range of input signal powers over which the generated distortion products remain below the output noise. However, these known RF systems rely on small signal modulator operation. Subsystem settings necessary to achieve linearization can be derived from small-signal approximations of the modulator transfer function. One feature of the present teaching is the realization that the derivation of settings necessary to achieve cancellation of both a high-power signal and the strongest third-order intermodulation distortion products requires a large-signal model using Bessel functions of the first kind. This use of the large-signal model and modulation with the nonlinear function modification described herein can provide minimization of the interference signal at both the interferer frequency and at the strongest third-order intermodulation distortion frequencies. Furthermore, these features are provided without also suppressing the signal of interest, which occurs with some known high-power signal suppression approaches.

A first CW laser 202 includes an optical output that is coupled to an optical input of a first Mach-Zehnder electro-optic modulator 204. The first CW laser 202 generates an optical signal at a first wavelength, $\lambda_A$. The output of the first modulator 204 is optically coupled to an input of a wavelength division multiplexer 210 (or other optical combiner element). A second CW laser 206 includes an optical output that is coupled to an optical input of a second Mach-Zehnder electro-optic modulator 208. The second CW laser 206 generates an optical signal at a second wavelength, $\lambda_B$. However, it should be understood that in some methods and apparatus according to the present teaching, a single laser wavelength can be used. That is, the first wavelength, $\lambda_A$ can be the same as the second wavelength, $\lambda_B$. The output of the second modulator 208 is optically coupled to another input of the wavelength division multiplexer 210 (or other optical combiner element). The wavelength division multiplexer 210 combines the optical signals at the two wavelengths, $\lambda_A$, $\lambda_B$ at an output.

The output of the wavelength division multiplexer 210 is optically coupled to an optical link 212. For example, the optical link 212 can be a single mode fiber optical link. An input of a photodetector 214 is coupled to the optical link 212. The photodetector 214 provides a current, I, at an electrical output in response to the detected optical signal provided by the link 214. In cases of a single wavelength, other optical combiners can be used.

A driver circuit 216 includes electrical outputs that are connected to the electrical modulation inputs of the first 204 and the second Mach-Zehnder electro-optic modulators 208. The driver circuit 216 includes first and second signal generators 218, 220 that generate RF signals at their respective outputs. In the experimental demonstration shown, the first signal generator 218 is an RF interference signal generator and the second signal generator 220 generates the signal of interest. In practical implementations of the present teaching these signal generators can be one or more receiving antenna that receives these signals.

The respective outputs of the first 218 and second signal generators 220 are coupled to respective inputs of the amplifier 222, 224. However, it should be understood that some embodiments of the Mach-Zehnder modulator link 200 do not include these amplifiers 222, 224.

The outputs of the first 218 and second signal generators 220 are electrically connected to inputs of respective ones of the first 226 and second electrical bandpass filters 228. However, it should be understood that some embodiments of the Mach-Zehnder modulator link 200 do not include these filters 226, 228. The filtered or unfiltered signals from the generators 218, 220 are combined in an electrical combiner 230. For example, the electrical combiner 230 can be a 3-dB combiner. The output of the electrical combiner 230 is electrically connected to a 90° hybrid coupler 232 that produces so-called I and Q signals which are phase shifted by 90° relative to one another. A first output 234 of the 90° hybrid coupler 232 is electrically connected to an electrical modulation input of the first Mach-Zehnder electro-optic modulators 204 and a second output 236 of the 90° hybrid coupler 232 is electrically connected to an electrical modulation input of the second Mach-Zehnder electro-optic modulators 208. An attenuator 242 can be used to attenuate the electrical modulation signal to the second Mach-Zehnder electro-optic modulators 208.

In operation, the first and second CW laser 202, 206 generate first and second optical signals at the first and second wavelengths, respectively. The first optical signal at the first wavelength propagates to the optical input of the first Mach-Zehnder electro-optic modulator 204 and the second optical signal at the second wavelength propagates to the optical input of the second Mach-Zehnder electro-optic modulator 206.

The driver circuit 216 generates the first modulation signal that modulates the first optical signal at the first wavelength and generates the second modulation signal that modulates the second optical signal at the second wavelength. The modulated first optical signal propagates to the first input of the wavelength division multiplexer 210 and the modulated second optical signal propagates to the second input of the wavelength division multiplexer 210. The wavelength division multiplexer 210 couples the multiplexed signal to the optical link 212. The photodetector 214 then generates an electrical current in response to the multiplexed signal on the optical link.

The driver circuit 216 generates the first and second modulation signals according to the present teaching so that the output power from the photodetector 214 is minimized at both the interferer frequency and at the strongest third-order intermodulation distortion frequencies without also suppressing the signal of interest. More specifically, the first and second signal generators 218, 220 generate RF signals at their respective outputs that can be amplified by their respective amplifier 222, 224. The resulting signals are filtered by respective ones of the first and second electrical bandpass filters 226, 228 and then combined by the combiner 230. The combined signal is then fed to the 90° hybrid coupler 232 that produces the I and Q signals that are phase shifted by 90° relative to one another. The function of the 90° hybrid coupler 232 is to split the signal and provide the desired relative phase shift. It should be understood that other splitter components can be used, for example, various directional coupler components can be used.

In one method of operation according to the present teaching, the various components of the driver 216 are configured and operated so that the input signal at the interferer frequency, $f_{INT}$, is made to modulate the first Mach-Zehnder modulator 204 at one of the zeroes of $J_1(\phi_{INT})$. The second Mach-Zehnder modulator 208 enables the nonlinear function modification. When the interferer signal's power causes the phase modulation in the arms of the modulator's 204 interferometer to correspond to the second zero of $J_1(\phi_{INT})$, which occurs at $\phi_{INT}$=7.0156, the RF attenuator 242 shown in FIG. 2 ensures that this same interferer signal power also corresponds to $\phi_{INT}$=3.8317 at the second modulator 208, which is the first zero of $J_1(\phi_{INT})$. Defining $r_I$ as the ratio of DC photocurrent imposed by the laser 206 at wavelength $\lambda_B$ to the DC photocurrent $I_{dc,A}$ imposed by the laser 204 at wavelength $\lambda_A$, the output photocurrent at the interferer, signal-of-interest, and third-order intermodulation distortion frequencies $f_{INT}$, $f_{SOI}$, and $2f_{INT} \pm f_{SOI}$, respectively, are as follows when one modulator is biased at a quadrature bias on a positive slope of its transfer function and the other at quadrature on a negative slope:

$$I(f_{INT}) = I_{dc,A} J_0(\phi_{SOI})[J_1(3.8317) - jr_I J_1(7.0156)]$$

$$I(f_{SOI}) \cong I_{dc,A} J_1(\phi_{SOI}) \left[ J_0(3.8317) - j\frac{7.0156}{3.8317} r_I J_0(7.0156) \right]$$

and $$I(2f_{INT} \pm f_{SOI}) \cong -I_{dc,A} J_1(\phi_{SOI}) \left[ J_2(3.8317) + \frac{7.0156}{3.8317} r_I J_2(7.0156) \right].$$

When the ratio of laser output powers is adjusted so that $r_I$=0.7331, these equations reduce to $$I(f_{INT}) = 0$$

$$I(f_{SOI}) \cong -0.4028[1+j]J_1(\phi_{SOI})I_{dc,A} \neq 0$$

and $$I(2f_{INT} \pm f_{SOI}) \cong 0.$$

Therefore, output power from the photodetector 214 is minimized at both the interferer frequency and at the strongest third-order intermodulation distortion frequencies without also suppressing the signal of interest. Such a result would not have been possible using the previously demonstrated single-modulator architecture. Thus, FIG. 2 illustrates application of nonlinear function modification that enables suppression of a high-power interferer at frequency $f_{INT}$ and recovers a lower-power signal of interest at frequency $f_{SOI}$ without generating an equally strong third-order intermodulation distortion product at frequencies $2f_{INT} \pm f_{SOI}$.

It should be understood that there are many different configurations that can be used to practice the present teaching. For example, in various embodiments, one or both of the generators 218, 220, one or both of the amplifiers 222, 224, one or both of the bandpass filters 226, 228 and/or the combiner 230 may not be included. In some embodiments, a signal comprising a low-power signal of interest and an interfering signal may be provided directly to a splitter (e.g. 90° hybrid coupler 232). Also, in some embodiments, an antenna is connected to the splitter (e.g. 90° hybrid coupler 232) to provide the RF signal.

An experiment was performed to confirm that the architecture in FIG. 2 successfully recovers a low-power signal of interest while suppressing a high-power interferer and the strong third-order intermodulation distortion product generated by known techniques. In this experiment, the high- and low-power input signals were supplied at frequencies $f_{INT}$=500 MHz from generator 218 and $f_{SOI}$=200 MHz from the other generator 220. The arrangement of the directional coupler 232 and RF attenuator 242 shown in FIG. 2 caused the input signals at $f_{INT}$ and $f_{SOI}$ to be imposed at the input to one of the two modulators 204 at a power ~5 dB higher than at the input to the other modulator 208, such that a high-power signal input power existed that corresponded to the first two zeros of $J_1(\phi)$.

In general, this analog-domain implementation of nonlinear function modification requires that light in two optical paths be modulated separately and combined onto a single photodetector. Optical combination of the two modulated optical carriers can be carried out most efficiently when a commercially available wavelength-division multiplexer (WDM) is used to incoherently combine light of two different wavelengths. In the specific implementation shown in FIG. 2, laser A 202 and laser B 206 supplied optical carriers at wavelengths $\lambda_A$ and $\lambda_B$ differing in frequency by 200 GHz with powers that induced DC photocurrents at quadrature of 4.5 mA and 3.3 mA, respectively, such that the ratio $r_I$ was ~0.73. The above equations show that this set of operating conditions should result in suppression of the output signals at both $f_{INT}$=500 MHz and $2f_{INT}$-$f_{SOI}$=800 MHz without significantly suppressing the signal of interest at $f_{SOI}$=200 MHz.

Figure 3:
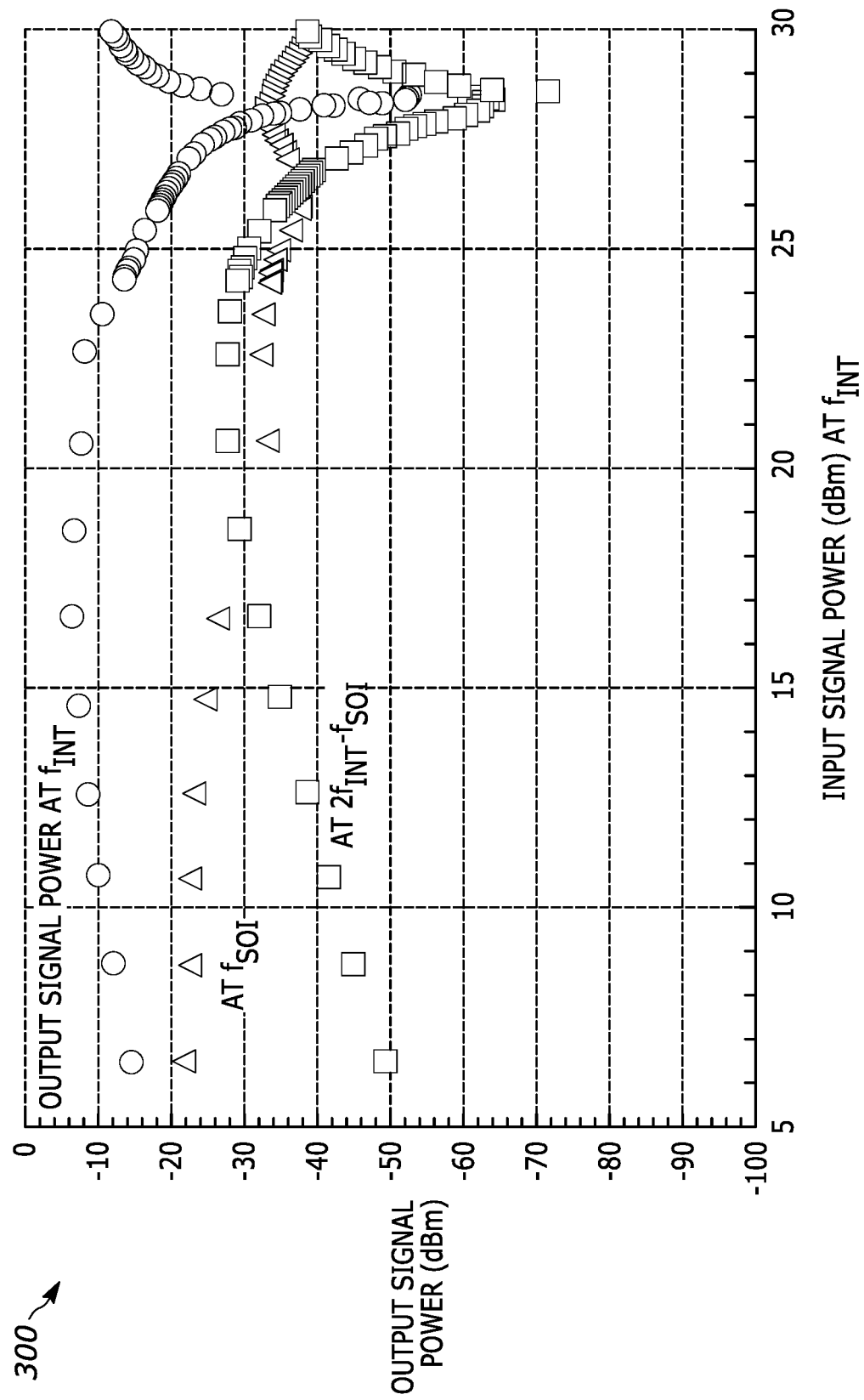
FIG. 3 illustrates a graph showing measured results from an experiment to verify the nonlinear function modification capability of the architecture described in connection with FIG. 2.

FIG. 3 illustrates a graph 300 showing measured results from the experiment to verify the nonlinear function modification capability of the architecture described in connection with FIG. 2. For a low-power signal at $f_{SOI}$=200 MHz with a constant input power of −10 dBm and a high-power signal at $f_{INT}$=500 MHz with input power varying from +6.5 dBm to +30 dBm, the measured output power at, $f_{SOI}$, $f_{INT}$, and $2f_{INT}$−$f_{SOI}$=800 MHz are plotted, showing that, for a high-power input signal power of +28.5 dBm, both the high-power signal at $f_{INT}$, and the intermodulation distortion product at $2f_{INT}$−$f_{SOI}$ are greatly suppressed while preserving the low-power signal at $f_{SOI}$.

In particular, the graph 300 of FIG. 3 shows the output signals measured on an RF spectrum analyzer under the above conditions. For a low-power signal at $f_{SOI}$=200 MHz with a constant input power of −10 dBm and a high-power signal at $f_{INT}$=500 MHz with input power varying from +6.5 dBm to +30 dBm, the measured output power at, $f_{SOI}$, $f_{INT}$, and $2f_{INT}$−$f_{SOI}$=800 MHz are plotted, showing that, for a high-power input signal power of +28.5 dBm, both the high-power signal at $f_{INT}$, and the intermodulation distortion product at $2f_{INT}$−$f_{SOI}$ are greatly suppressed while preserving the low-power signal at $f_{SOI}$. Compared to the results obtained using the known techniques as illustrated in FIG. 1, the measured results illustrated in FIG. 3 show suppression of the high-power signal to the same degree as had been achieved using the single modulator technique, but also show suppression of the third-order intermodulation distortion product by approximately 30 dB relative to what was achieved in the prior art technique. The low-power signal of interest, meanwhile, is not suppressed, and this shows that nonlinear function modification has been successfully realized to accomplish the interference suppression objective that can be achieved by the present teaching.

If both modulators were biased exactly at quadrature points and there were no other contributions to 2nd-order distortion, the outputs at $2f_{SOI}$ and $f_{INT}$±$f_{SOI}$ would ostensibly be zero. Therefore all of the most problematic intermodulation distortion products and the second harmonic of the high-power signal are all suppressed while preserving the low-power signal of interest.

Thus, the method and apparatus of the present teaching overcomes the deficiencies of known methods and systems in performing interference suppression with intermodulation distortion mitigation. An RF signal comprising an RF signal of interest and an RF interfering signal is processed to produce a first and second RF drive signal, each with a desired RF interfering signal power and having a 90 degree relative phase. For example, the processing can be attenuating, amplifying, and/or filtering. In many systems, the desired RF interfering signal power can be adjusted so that the third-order intermodulation distortion products remain below a predetermined noise level.

The first RF drive signal is imposed or modulated onto a first optical signal with an optical modulator having a sinusoidal transfer function and biased at quadrature with a first slope, thereby generating a first modulated optical signal. The first RF drive signal with the desired RF interfering signal power causes the modulator to have a large-signal behavior that is characterized by a Bessel function of the first kind J1($\phi$), wherein the desired RF interfering signal power of the first drive signal is chosen to correspond to a zero of the Bessel function of the first kind J1($\phi$). Similarly, the second RF drive signal is imposed or modulated onto a second optical signal with an optical modulator having a sinusoidal transfer function and biased at quadrature with a second slope having a direction that is opposite to a direction of the first slope, thereby generating a second modulated optical signal. The first and second optical frequency can be the same or different optical frequencies. The second RF drive signal with the desired RF interfering signal power causes the modulator to have a large-signal behavior that is characterized by a Bessel function of the first kind J1($\phi$), wherein the desired power at a frequency of the interference signal of the second drive signal is chosen to correspond to another zero of the Bessel function of the first kind J1($\phi$). The first and second modulated optical signal are combined with an optical power ratio that is selected to suppress third-order intermodulation distortion products in an electrical signal generated by detecting the optically combined first and second modulated optical signals.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A method of interference suppression with intermodulation distortion mitigation, the method comprising:
   a) processing an RF signal comprising an RF signal of interest and an RF interfering signal to produce a first and second RF drive signal each with a desired RF interfering signal power and having a 90 degree relative phase;
   b) imposing the first RF drive signal onto a first optical signal with an optical modulator having a sinusoidal transfer function and biased at quadrature with a first slope, thereby generating a first modulated optical signal, the first RF drive signal with the desired RF interfering signal power causing the modulator to have a large-signal behavior that is characterized by a Bessel function of the first kind $J_1(\phi)$, wherein the desired RF interfering signal power of the first drive signal is chosen to correspond to a zero of the Bessel function of the first kind $J_1(\phi)$;
   c) imposing the second RF drive signal onto a second optical signal with an optical modulator having a sinusoidal transfer function and biased at quadrature with a second slope having a direction that is opposite to a direction of the first slope, thereby generating a second modulated optical signal, the second RF drive signal with the desired RF interfering signal power causing the modulator to have a large-signal behavior that is characterized by a Bessel function of the first kind $J_1(\phi)$, wherein the desired power at a frequency of the interference signal of the second drive signal is chosen to correspond to another zero of the Bessel function of the first kind $J_1(\phi)$; and
   d) optically combining the first and second modulated optical signal with an optical power ratio that is selected to suppress third-order intermodulation distortion products in an electrical signal generated by detecting the optically combined first and second modulated optical signals.

2. The method of claim 1 wherein the processing comprises attenuating the RF signal.

3. The method of claim 1 wherein the processing comprises amplifying the RF signal.

4. The method of claim 1 wherein the processing comprises filtering the RF signal.

5. The method of claim 4 wherein the filtering comprises bandpass filtering.

6. The method of claim 1 wherein the first optical signal is at a first wavelength and the second optical signal is at a second wavelength.

7. The method of claim 1 wherein the first wavelength and the second wavelength are the same wavelength.

8. The method of claim 1 wherein the optical modulators having the sinusoidal transfer function are Mach-Zehnder interferometric modulators.

9. The method of claim 1 further comprising adjusting the desired RF interfering signal power of the first and second drive signals so that the third-order intermodulation distortion products remain below a predetermined noise level.

10. The method of claim 1 further comprising detecting the optically combined first and second modulated optical signals and generating the electrical signal.

11. A method of interference suppression with intermodulation distortion mitigation, the method comprising:
   a) processing an RF signal comprising an RF signal of interest and an RF interfering signal;
   b) splitting and phase shifting the processed RF signal to produce a first and second RF drive signal that are phase shifted by 90° relative to one another;
   c) attenuating at least one of the first and second RF drive signals to provide a first RF drive signal with a desired RF interfering signal power and a second RF drive signal with a desired RF interfering signal power;
   d) modulating a first optical signal with the first RF drive signal using a first optical interferometric modulator with a sinusoidal transfer function biased at quadrature with a first slope, the first RF drive signal with the desired RF interfering signal power causing the first optical interferometric modulator to have a large-signal behavior that is characterized by a Bessel function of the first kind $J_1(\phi)$, wherein the desired RF interfering signal power at a frequency of the interference signal of the first drive signal is chosen to correspond to a zero of the Bessel function of the first kind $J_1(\phi)$;
   e) modulating a second optical signal with the second RF drive signal using a second optical interferometric modulator with a sinusoidal transfer function biased at quadrature with a second slope having a direction that is opposite to a direction of the first slope, the second RF drive signal with the desired RF interfering signal power causing the second optical interferometric modulator to have a large-signal behavior that is characterized by a Bessel function of the first kind $J_1(\phi)$, wherein the desired power at a frequency of the interference signal of the second drive signal is chosen to correspond to another zero of the Bessel function of the first kind $J_1(\phi)$;
   f) combining the first and second modulated optical signal; and
   g) detecting the combined first and second modulated optical signals to generate an electrical signal, wherein the combining the first and second modulated optical signal is performed with an optical power ratio such that the electrical signal represents the RF signal of interest with the RF interfering signal suppressed and third-order intermodulation distortion products reduced.

12. The method of claim 11 wherein the processing the RF signal comprises filtering the RF signal.

13. The method of claim 12 wherein the filtering the RF signal comprises bandpass filtering the RF signal.

14. The method of claim 11 wherein the processing the RF signal comprises amplifying the RF signal.

15. The method of claim 11 wherein the processing the RF signal comprises attenuating the RF signal.

16. The method of claim 11 wherein at least one of the first and second interferometric modulators comprises a Mach-Zehnder modulator.

17. An interference suppression with intermodulation distortion mitigation system, the system comprising:
   a) an electrical input that receives an RF signal comprising an RF signal of interest and an RF interfering signal;
   b) an electrical splitter and attenuator having an input that is coupled to the electrical input, the electrical splitter and attenuator splitting the electrical input signal into an I signal at a first output and a Q-signal at a second output, wherein the I-signal and the Q-signal are phase shifted by 90° relative to one another and at least one of the I-signal and the Q-signal are attenuated;
   c) a first optical interferometric modulator with a sinusoidal transfer function biased at quadrature with a first slope, the first optical interferometric modulator having an optical input coupled to an output of a first laser that generates a first optical signal at a first wavelength and having an electrical input that is electrically coupled to the first output of the electrical splitter and attenuator, the first optical interferometric modulator generating a first modulated optical signal corresponding to a Bessel function of the first kind $J_1(\phi)$ driven to a zero;
   d) a second optical interferometric modulator with a sinusoidal transfer function biased at quadrature with a second slope having a direction that is opposite to a direction of the first slope, the second optical interferometric modulator having an optical input that coupled to an output of a second laser that generates a second optical signal at a second wavelength and having an electrical input that is electrically coupled to the second output of the electrical splitter and attenuator, the second optical interferometric modulator generating a second modulated optical signal corresponding to a Bessel function of the first kind $J_1(\phi)$ driven to another zero;
   e) an optical combiner that combines the first and second modulated optical signal; and
   f) an optical detector that detects the combined first and second modulated optical signals to generate an electrical signal, wherein
      the optical combiner combines the first and second modulated optical signal with an optical power ratio such that the electrical signal represents the signal of interest with the RF interfering signal suppressed and third-order intermodulation distortion products reduced.

18. The system of claim 17 wherein the electrical input is a single antenna.

19. The system of claim 17 wherein at least one of the first and second optical interferometric modulators is a Mach-Zehnder interferometric modulator.

20. The system of claim 17 wherein the electrical splitter and attenuator comprises a 90 degree hybrid coupler.

* * * * *